United States Patent
Moon et al.

(10) Patent No.: US 10,392,992 B2
(45) Date of Patent: Aug. 27, 2019

(54) EXHAUST GAS CLEANING SYSTEM AND MONITORING METHOD OF THE SAME

(71) Applicant: DOOSAN INFRACORE CO., LTD., Incheon (KR)

(72) Inventors: Seung-Eun Moon, Incheon (KR); In-Hyuk Im, Incheon (KR); Tae-Hyung Kim, Incheon (KR); Nam-Il Choi, Incheon (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 0 days.

(21) Appl. No.: 15/756,448

(22) PCT Filed: Aug. 29, 2016

(86) PCT No.: PCT/KR2016/009610
§ 371 (c)(1),
(2) Date: Feb. 28, 2018

(87) PCT Pub. No.: WO2017/039268
PCT Pub. Date: Mar. 9, 2017

(65) Prior Publication Data
US 2018/0266293 A1    Sep. 20, 2018

(30) Foreign Application Priority Data
Aug. 28, 2015   (KR) .................. 10-2015-0121671

(51) Int. Cl.
*F01N 11/00*   (2006.01)
*F01N 3/20*    (2006.01)
(Continued)

(52) U.S. Cl.
CPC .......... *F01N 3/208* (2013.01); *F01N 3/2066* (2013.01); *F01N 9/00* (2013.01); *F01N 11/002* (2013.01);
(Continued)

(58) Field of Classification Search
CPC ...... F01N 3/208; F01N 3/2066; F01N 11/002; F01N 2550/02; F01N 2560/08;
(Continued)

(56) References Cited

U.S. PATENT DOCUMENTS 7,500,356 B2   3/2009  Hirata et al.
8,156,728 B2   4/2012  Hinz et al.
(Continued)

FOREIGN PATENT DOCUMENTS

CN         104314652 A  *  1/2015
DE   10 2014 115 630 A1    4/2015
(Continued)

OTHER PUBLICATIONS

Machine translation of CN-104314652-A, accessed on Mar. 2, 2019. (Year: 2019).*
(Continued)

*Primary Examiner* — Jonathan R Matthias
(74) *Attorney, Agent, or Firm* — Hauptman Ham, LLP

(57) ABSTRACT

An exhaust gas cleaning system comprises a reducing agent injection module installed in an housing mounted in an exhaust pipe through which an exhaust gas is discharged, the reducing agent injection module being configured to inject a reducing agent into the housing, a selective catalyst reduction device installed in rear of the reducing agent injection module and configured to catalytic react the reducing agent with nitrogen oxide included in the exhaust gas to reduce the nitrogen oxide, a differential pressure sensor to detect a differential pressure between a pressure in the housing in front of the selective catalyst reduction device and a pressure of the housing in rear of the selective catalyst reduction device, and a control device to receive the pressure information from the differential pressure sensor and to output a
(Continued)

first warning signal when the detected differential pressure is lower than a predetermined pressure.

11 Claims, 3 Drawing Sheets

(51) Int. Cl.
- F01N 9/00 (2006.01)
- G01L 13/00 (2006.01)
- G01F 1/34 (2006.01)

(52) U.S. Cl.
CPC ............... *G01F 1/34* (2013.01); *G01L 13/00* (2013.01); *F01N 2330/38* (2013.01); *F01N 2550/02* (2013.01); *F01N 2560/026* (2013.01); *F01N 2560/08* (2013.01); *F01N 2560/14* (2013.01); *F01N 2570/14* (2013.01); *F01N 2610/02* (2013.01); *F01N 2900/08* (2013.01); *F01N 2900/1402* (2013.01); *F01N 2900/1406* (2013.01); *F01N 2900/1621* (2013.01); *Y02A 50/2325* (2018.01); *Y02T 10/24* (2013.01); *Y02T 10/47* (2013.01)

(58) Field of Classification Search
CPC ......... F01N 2610/02; F01N 2900/1406; F01N 2900/1621
See application file for complete search history.

(56) References Cited

U.S. PATENT DOCUMENTS

| | | |
|---|---|---|
| 2014/0023576 A1 | 1/2014 | Yezerets et al. |
| 2015/0101310 A1 | 4/2015 | Kowalkowski et al. |
| 2015/0176456 A1 | 6/2015 | Cho et al. |
| 2015/0315950 A1 | 11/2015 | Hagimoto |
| 2015/0315951 A1 | 11/2015 | Veldten et al. |

FOREIGN PATENT DOCUMENTS

| | | | |
|---|---|---|---|
| JP | 2005-214169 A | | 8/2005 |
| JP | 2008-545092 A | | 12/2008 |
| KR | 10-2015-0073577 A | | 7/2015 |
| KR | 10-2015-0079928 A | | 7/2015 |
| WO | 2007/008121 A1 | | 1/2007 |
| WO | 2014/087536 A1 | | 6/2014 |

OTHER PUBLICATIONS

International Search Report for PCT/KR2016/009610 dated Nov. 9, 2016.

European Search Report dated Jan. 3, 2019, issued in corresponding European Patent Application No. 16842234.3.

* cited by examiner

EXHAUST GAS CLEANING SYSTEM AND MONITORING METHOD OF THE SAME

CROSS REFERENCE TO RELATED APPLICATION

This present application is a national stage filing under 35 U.S.C § 371 of PCT application number PCT/KR2016/009610 filed on Aug. 29, 2016 which is based upon and claims the benefit of priority to Korean Patent Application No. 10-2015-0121671 filed on Aug. 28, 2015 in the Korean Intellectual Property Office. The disclosures of the above-listed applications are hereby incorporated by reference herein in their entirety.

BACKGROUND

1. Field

Example embodiments relate to an exhaust gas cleaning system and a monitoring method of the same. More particularly, example embodiments relate to an exhaust gas cleaning system including a selective catalytic reduction device and a method of monitoring the same.

2. Description of the Related Art

A diesel engine using compression-ignition combustion has advantages such as a high expansion ratio, but has disadvantages such as vibrations, emissions of pollutants including nitrogen oxide (NOx) and dust or the like. Thus, in order to meet increasingly stringent exhaust gas regulation, an exhaust gas after-treatment device including a selective catalytic reduction (SCR) device may be provided.

The selective catalytic reduction device may react catalytically a reducing agent such as urea with nitrogen oxide (NOx) of an exhaust gas such that the nitrogen oxide is reduced into a nitrogen gas and water.

However, when the temperature of the exhaust gas drops or an amount of the exhaust gas is reduced, urea injected from a reducing agent injection module may be adhered on an inner wall of the selective catalytic reduction device to be crystallized. Further, when a fuel of low quality is used, urea may be combined with soot to block an entrance of the selective catalytic reduction device. Thus, performance of the selective catalytic reduction device may be deteriorated, and the exhaust gas pressure of an engine may be increased to deteriorate performance of the engine.

SUMMARY

Example embodiments provide an exhaust gas cleaning system.

Example embodiments provide a method of monitoring the exhaust gas cleaning system.

According to example embodiments, an exhaust gas cleaning system comprises a reducing agent injection module installed in an housing which is configured to be mounted in an exhaust pipe through which an exhaust gas is discharged from an engine, the reducing agent injection module being configured to inject a reducing agent into the housing, a selective catalyst reduction device installed in rear of the reducing agent injection module and configured to catalytic react the reducing agent with nitrogen oxide included in the exhaust gas to reduce the nitrogen oxide, a differential pressure sensor to detect a differential pressure between a pressure in the housing in front of the selective catalyst reduction device and a pressure of the housing in rear of the selective catalyst reduction device, and a control device to receive the pressure information from the differential pressure sensor and to output a first warning signal when the detected differential pressure is lower than a predetermined pressure.

In example embodiments, the engine may be a mechanic engine, and an injection amount of the reducing agent of the reducing agent injection module may be controlled based on at least one of a change of an intake air amount and a concentration change of the nitrogen oxide in the exhaust gas.

In example embodiments, the exhaust gas cleaning system may further include an air amount sensor to detect an amount of an air flowing into the engine, and the control device may receive information of the intake air amount from the air amount sensor to control the injection amount of the reducing agent of the reducing agent injection module.

In example embodiments, the air amount sensor may be a manifold absolute pressure (MAP) sensor.

In example embodiments, the exhaust gas cleaning system may further include a first concentration sensor and a second concentration sensor respectively installed in a sidewall of the housing in front and rear of the selective catalytic reduction device to detect a concentration of nitrogen oxide within the housing.

In example embodiments, the control device may receive concentration information of nitrogen oxide from the first and second concentration sensors, may calculate conversion efficiency of nitrogen oxide of the selective catalytic reduction device from the received concentration information, and may output a second warning signal different from the first warning signal when the calculated conversion efficiency is lower than a predetermined efficiency.

In example embodiments, the control device may output a third warning signal different from the first and second warning signals when the conversion efficiency is greater than the predetermined efficiency and the detected differential pressure is greater than the predetermined pressure.

In example embodiments, the exhaust gas cleaning system may further include a display device to inform a user of the first to third warning signals, and the display device may include a first display to be operable when the conversion efficiency is lower than the predetermined efficiency, and a second display to be operable when the detected differential pressure is greater than the predetermined pressure.

In example embodiments, the exhaust gas cleaning system may further include a display device to inform a user of the first warning signal.

In example embodiments, the exhaust gas cleaning system may further include a mixing device installed between the reducing agent injection module and the selective catalytic reduction device in order to mix gently the reducing agent with the exhaust gas. In this case, the differential pressure sensor may be connected to a first pressure line which is in communication with the housing in front of the selective catalytic reduction device and a second pressure line which is in communication with the housing in rear of the selective catalytic reduction device.

In example embodiments, the housing may include a front side housing and a rear side housing combined separably with each other, a carrier of the selective catalytic reduction device being disposed in the rear side housing having, and the first pressure line may be connected to the housing between the mixing device and the carrier of the selective catalytic reduction device.

According to example embodiments, in a method of method of monitoring an exhaust gas cleaning system, a differential pressure of an exhaust gas between front and rear of a selective catalytic reduction device and concentration of nitrogen oxide included in the exhaust gas are detected. Conversion efficiency of nitrogen oxide of the selective catalytic reduction device is calculated from the detected concentration information. Whether or not the selective catalytic reduction device is in an abnormal state is determined based on the calculated conversion efficiency and the detected differential pressure. A warning signal is outputted when it is determined that the selective catalytic reduction device is in an abnormal state.

In example embodiments, determining whether or not the selective catalytic reduction device is in an abnormal state may include determining that the selective catalytic reduction device is in an abnormal state when the calculated conversion efficiency is lower than a predetermined efficiency or the detected differential pressure is greater than a predetermined pressure.

In example embodiments, determining whether or not the selective catalytic reduction device is in an abnormal state may include determining that the selective catalytic reduction device is in an abnormal state when the calculated conversion efficiency is greater than the predetermined efficiency and the detected differential pressure is greater than the predetermined pressure.

In example embodiments, determining whether or not the selective catalytic reduction device is in an abnormal state comprising determining that the selective catalytic reduction device is partially blocked when the detected differential pressure is greater than the predetermined pressure to alarm that the selective catalytic reduction device needs to be cleaned.

According to example embodiments, an exhaust gas cleaning system may control directly an injection amount of a reducing agent, and thus, may be applied for the mechanic engine which does not an electronic control unit (ECU).

Further, since abnormality of a selective catalytic reduction device is determined and informed to a user, maintenance may be induced to maintain performance of the selective catalytic reduction device.

However, the effect of the invention may not be limited thereto, and may be expanded without being deviated from the concept and the scope of the present invention.

DETAILED DESCRIPTION OF EXAMPLE EMBODIMENTS

Figure 1:
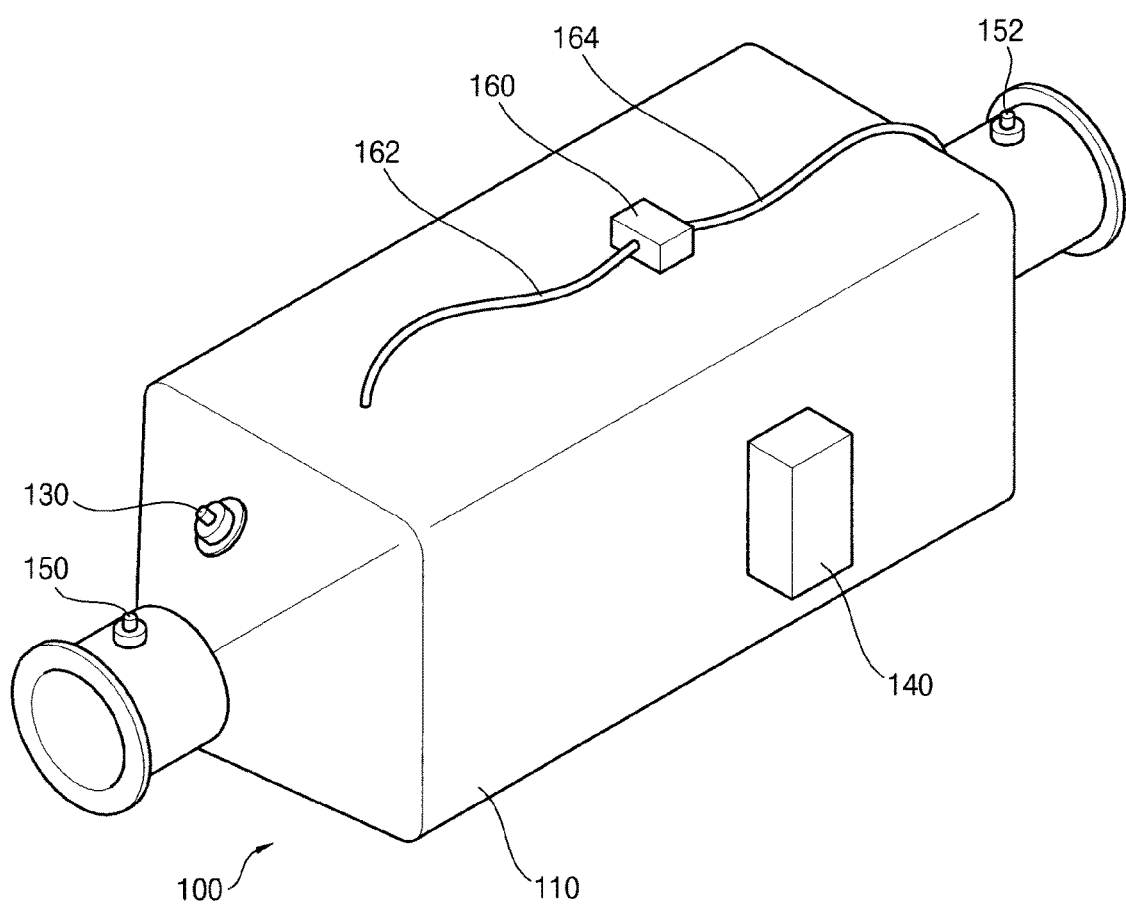
FIG. 1 is a perspective view illustrating an exhaust gas cleaning system in accordance with example embodiments.

Various example embodiments will be described more fully hereinafter with reference to the accompanying drawings, in which example embodiments are shown. Example embodiments may, however, be embodied in many different forms and should not be construed as limited to example embodiments set forth herein. Rather, these example embodiments are provided so that this disclosure will be thorough and complete, and will fully convey the scope of example embodiments to those skilled in the art. In the drawings, the sizes and relative sizes of components or elements may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element or layer is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
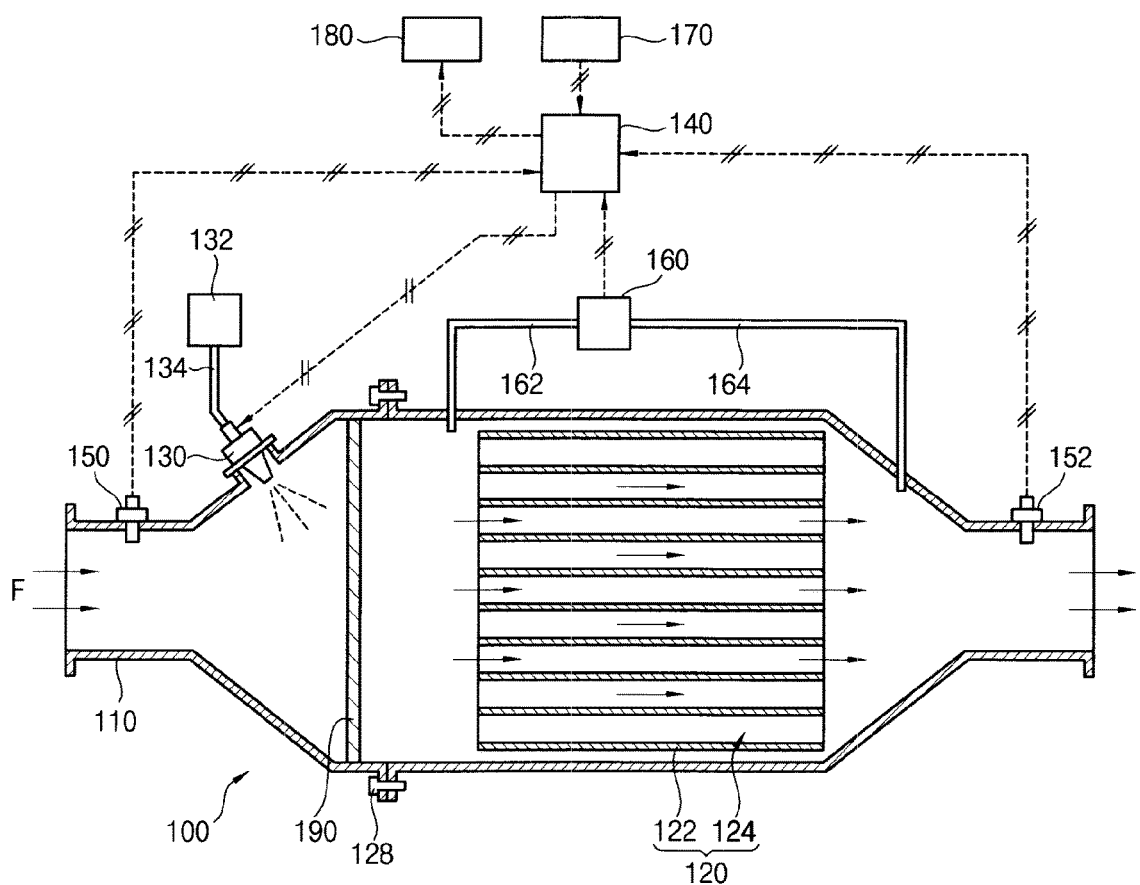
FIG. 2 is a cross-sectional view illustrating the exhaust gas cleaning system in FIG. 1.

FIG. 1 is a perspective view illustrating an exhaust gas cleaning system in accordance with example embodiments. FIG. 2 is a cross-sectional view illustrating the exhaust gas cleaning system in FIG. 1.

Referring to FIGS. 1 and 2, an exhaust gas cleaning system 100 may include a housing 110 connected to an exhaust pipe (not illustrated) through which an exhaust gas is discharged from an engine (not illustrated), a reducing agent injection module 130 and a selective catalyst reduction (SCR) device 120 installed sequentially in the housing 110, a first concentration sensor 150 and a second concentration sensor 152 respectively installed in a wall of the housing 110 in front and rear of the SCR device 120 to detect a concentration of nitrogen oxide within the housing 110, a differential pressure sensor 160 to detect a differential pressure between an inner pressure of the housing 110 in front of the SCR device 120 and an inner pressure of the housing 110 in rear of the SCR device 120, a control device 140 to control an injection amount of the reducing agent of the reducing agent injection module 130 and output a warning signal when the SCR device is in an abnormal state, and a display device 180 to display the warning signal to a user. In here, 'being in front of' means being relatively more near the engine along a flow (F) of the exhaust gas exhausted from the engine, and 'being in rear of' means being relatively farther away from the engine along the flow (F) of the exhaust gas exhausted from the engine.

In example embodiments, the engine may be a mechanic engine. In the mechanic engine, a condition of the engine may be manually controlled in a mechanical way, for example, by a user manipulation of a pedal or throttle lever, etc. In contrast, in an electronic engine, a condition of the engine may be automatically controlled by an electronic control unit (ECU). That is, in the mechanic engine, a user may control manually a fuel injection amount by the pedal, the lever, etc, while, in the electronic engine, the electronic control unit may control automatically a fuel injection, an intake air amount, the injection amount of the reducing agent, etc. However, the after-mentioned control device 140 may control automatically the injection amount of the reducing agent of the reducing agent injection module 130 using intake air amount information of the engine which is outputted from an air amount sensor 170.

A first end of the housing 110 may be connected to the exhaust pipe which is connected to the engine. A second end of the housing 110 opposite to the first end may be connected to the outside or another exhaust cleaning device such as an ammonia slip catalyst device (not illustrated). For example, the housing may include a material the same as the exhaust pipe.

The exhaust gas discharged from the engine may flow into the housing 110 through the exhaust pipe. The exhaust gas may be mixed with the reducing agent injected by the reducing agent injection module 130 within the housing 110, thereby removing the nitrogen oxide (NOx), and then may be discharged into the outside. In this case, the first and second concentration sensors 150, 152, and first and second pressure lines 162, 164 may be installed in the sidewall of the housing 110.

In example embodiments, the housing may be installed detachably in the exhaust pipe. For example, a front side housing may be combined separably with a rear side housing in which an after-mentioned carrier 122 is installed. In this case, as illustrated in FIG. 2, the housing between the carrier 122 and an after-mentioned mixing device 190 may be separated into the front side housing and the rear side housing, flanges (connection members) of the front side housing and the rear side housing may be fixed by a fastening member 128 such as a bolt to form the housing. Accordingly, when the housing is separable, the first pressure line 162 may be connected to the housing in rear of the flanges, to thereby easily install and remove the housing.

The reducing agent injection module 130 may be installed in front of the SCR device 120 and may spray a reducing agent such as urea into the housing 110 to reduce the nitrogen oxide in the exhaust gas exhausted from the engine. In example embodiments, the reducing agent injection module 130 may inject the reducing agent having an injection amount corresponding to a change of the intake air amount, a change of the nitrogen oxide in the exhaust gas or a combination thereof. The injection amount of the reducing agent may be controlled by the control device 140 or an extra control device provided in the reducing agent injection module 130. The change of the intake air amount may be detected by the air amount sensor 170 or calculated based on a user manipulation amount of the pedal or lever. The change of the nitrogen oxide may be detected by the first concentration sensor 150. The injection amount of the reducing agent may be corrected after receiving feedback on nitrogen oxide detected amount of the second concentration sensor 152.

For example, the reducing agent injection module 130 may be connected to a reducing agent storage tank 132 through a reducing agent supply line 134 to inject the reducing agent into the housing 110. Because the temperature of the exhaust gas from the engine ranges as high as several hundreds of degrees (° C.), the reducing agent may be injected into the housing 110 and then be vaporized immediately. The vaporized reducing agent may be mixed with the exhaust gas, and the nitrogen oxide may react with the reducing agent in the SCR device 120 such that the nitrogen oxide is reduced into a nitrogen gas and water.

In example embodiments, the exhaust gas cleaning system 100 may further include a mixing device 190 between the reducing agent injection module 130 and the SCR device 120. The mixing device 190 may mix gently the reducing agent injected from the reducing agent injection module 130 and the exhaust gas to increase reduction efficiency of nitrogen oxide of the SCR device 120. The mixing device 190 may be omitted as needed.

The SCR device 120 may be installed in rear of the reducing agent injection module 130 within the housing 110, and may reduce the nitrogen oxide into harmless nitrogen ($N_2$) by Reaction Equations 1 to 3.

$$(NH_2)_2CO + H_2O \rightarrow CO_2 + 2NH_2 \quad \text{[Reaction Equation 1]}$$

$$4NO + 4NH_2 + O_2 \rightarrow 4N_2 + 6H_2O$$

$$6NO_2 + 8NH_3 \propto 7N_2 + 12H_2O \quad \text{[Reaction Equation 3]}$$

Urea ($(NH_2)_2CO$) supplied from the reducing agent injection module 130 may generate ammonia ($NH_3$) by hydrolysis. The generated ammonia may reduce NO and $NO_2$, and convert into harmless nitrogen gas ($N_2$).

In example embodiments, the SCR device 120 may include the carrier 122 having a plurality of passages 124. The carrier 122 may have a plurality of the passages 124 extending in an axial direction, to increase a contact area with the exhaust gas.

For example, the carrier may be formed by extrusion of a ceramic raw material to have a honeycomb shape. Examples of the carrier 122 may be cordierite, silicon carbide fecalloy, NiCrAl, NiFeCrAl, etc. Alternatively, the carrier 122 may be formed of metal to have a porous structure. For example, the carrier 122 may be formed to have a metal fiber structure with a matrix of metal fibers, or a metal foam with numerous pores.

In example embodiments, the exhaust gas cleaning system may further an ammonia slip catalyst device (not illustrated) which is installed in rear of the SCR device 120 to remove ammonia from the exhaust gas.

The ammonia generated by the reducing agent injected by the reducing agent injection module 130 to reduce nitride oxide in the exhaust gas. In here, more ammonia than a stoichiometric amount may be supplied to maximize the reduction efficiency of nitrogen oxide. Thus, ammonia unreacted during the catalyst reaction, referred to as ammonia slip, may be released into the atmosphere, causing air pollution. The ammonia slip catalyst device may remove the residual ammonia to prevent the ammonia slip.

The first concentration sensor 150 may be installed in the sidewall of the housing 110 in front of the SCR device 120, and the second concentration sensor 152 may be installed in the sidewall of the housing 110 in rear of the SCR device 120. The first and second concentration sensors 150, 152 may detect concentration of nitrogen oxide (NOx) included in the exhaust gas within the housing 110. That is, the first concentration sensor 150 may detect concentration of nitrogen oxide of the exhaust gas flowing into the SCR device 120, and the second concentration sensor 152 may detect concentration of nitrogen oxide of the exhaust gas emitting from the SCR device 120. The detected concentration information may be inputted to the control device 140.

In example embodiments, the differential pressure sensor 160 may include the first pressure line 162 and the second pressure line 164 which extend from the inside to the outside of the housing 110 respectively. An end portion of the first pressure line 162 may extend through the sidewall of the housing 110 in front of the SCR device 120 to contact the exhaust gas, and another end portion of the first pressure line 162 may be connected to the differential pressure sensor 160. An end portion of the second pressure line 164 may extend through the sidewall of the housing 110 in rear of the SCR device 120 to contact the exhaust gas, and another end portion of the second pressure line 164 may be connected to the differential pressure sensor 160. For example, the first and second pressure lines may be hoses which connect the differential pressure sensor and the inside of the housing. Alternatively, the first and second pressure lines may be connected to the exhaust line instead of the housing. In this case, pressure may be detected to check the presence of a masking phenomenon which is generated when foreign substance is deposited in the inlet of the carrier 122. Further, as mentioned above, in case that the housing is separable, the first pressure line 162 may be easily installed. In example embodiments, an extra pressure sensor may be installed in front of the mixing device 190 separately with the first and second pressure lines. In this case, the blockage in each of the mixing device 190 and the carrier 122 may be detected.

The differential pressure sensor 160 may be connected to the first pressure line 162 and the second pressure line 164, to detect a difference between the pressure in the first pressure line 162 and the pressure in the second pressure line 164. In here, the pressure in the first pressure line 162 may be the same as the pressure of the inside of the housing 110 in front of the SCR device 120, and the pressure in the second pressure line 164 may be the same as the pressure of the inside of the housing 110 in rear of the SCR device 120. The differential pressure sensor 160 may detect a differential pressure between the inner pressure of the housing 110 in front of the SCR device 120 and the inner pressure of the housing 110 in rear of the SCR device 120. The detected pressure information may be inputted to the control device 140.

In example embodiments, the exhaust gas cleaning system 100 may further include an air amount sensor 170 which is connected to an intake manifold of the engine to detect an amount of an air flowing into the engine. The detected air amount information may be inputted to the control device 140, and the control device 140 may be determine the reducing agent injection amount of the reducing agent injection module 130 suing the inputted air amount information and the concentration information of nitrogen oxide of the exhaust gas.

For example, the air amount sensor 170 may include a manifold absolute pressure (MAP) sensor. The MAP sensor may be installed in the intake manifold or in the sidewall of the housing 110 to be connected to the intake manifold. The MAP sensor may measure absolute pressure in the intake manifold, to detect indirectly the amount of the air flowing into the engine. The detected air amount information may be inputted to the control device 140.

The control device 140 may be mounted on the sidewall of the housing 110 or may be separated from the housing 110 to be mounted in the vehicle. The control device 140 may receive the information from the sensors 150, 152, 160, 170, and may control the reducing agent injection module 130 or output a warning signal to a user based on the received information.

In example embodiments, the information detected from the sensors 150, 152, 160, 170 may be transmitted to the control device 140 through wireless communication such as CAN (Controller Area Network), LIN (Local Interconnect Network), FlexRay, etc. Alternatively, at least one of the sensors 150, 152, 160, 170 may be connected directly to the control device 140 through a wire.

The control device 140 may receive the information of an amount of an air supplied to the engine from the air amount sensor 170, and the concentration information of nitrogen oxide within the housing 110 from the first concentration sensor 150. The control device 140 may calculate an amount of the reducing agent to be required within the housing 110 using the air amount information and the concentration information of nitrogen oxide, and may output a control signal to the reducing agent injection module 130.

The control device 140 may determine whether or not the SCR device 120 is in an abnormal state, to output a warning signal to a user.

For example, the control device 140 may receive the concentration information of nitrogen oxide within the housing 110 from the first and second concentration sensors 150, 152. In particular, the control device 140 may receive the concentration information of nitrogen oxide in front of the SCR device 120 from the first concentration sensor 150, and may receive the concentration information of nitrogen oxide in rear of the SCR device 120 from the second concentration sensor 152. The control device 140 may use the received concentration information to calculate conversion efficiency of nitrogen oxide of the SCR device 120, and may compare the calculated conversion efficiency with a predetermined efficiency (hereinafter, referred to as 'standard efficiency') to determine the abnormality of the SCR device 120. That is, when the calculated conversion efficiency is greater than the standard efficiency, it may be determined that the SCR device 120 is in a normal state, while when the calculated conversion efficiency is lower than the standard efficiency, it may be determined that the SCR device 120 is in an abnormal state and the SCR device 120 needs to change. The control device 120 may output a warning signal which informs that the SCR device 120 needs to be replaced, to the display device 180. In this case, a user may replace the SCR device 120 with a new one.

Additionally, the control device 140 may receive information of the differential pressure between an inner pressure of a housing 110 in front of the SCR device 120 and an inner pressure of the housing 110 in rear of the SCR device 120. The control device 140 may compare the received differential pressure with a predetermined pressure (hereinafter, referred to as 'standard pressure') to determine the abnormality of the SCR device 120.

In particular, when the received differential pressure is lower than the standard pressure, it may be determined that the SCR device 120 is in a normal state, while when the received differential pressure is greater than the standard pressure, it may be determined that the SCR device 120 is in an abnormal state. For example, when a fuel of low quality is used, a large amount of substance such as soot may be included in the exhaust gas, and thus, the substance may react with the reducing agent to block the front side of the SCR device 120. Accordingly, the differential pressure between the front side and the rear side of the SCR device 120 may be detected to be greater.

When it is determined that the SCR device 120 is partially blocked, the control device 140 may output a warning signal which informs that the SCR device 120 needs to be cleaned, to the display device 180. In order to perform the cleaning, a user may increase a fuel injection amount to increase the temperature of the exhaust gas, to thereby remove the substance adsorbed on the SCR device 120. When the housing is configured to be separable, a user or an operator may separate the housing and then perform the cleaning. This manual cleaning may be performed when the pressure abnormality is detected even after increasing the temperature of the exhaust gas.

The display device 180 may receive the warning signal from the control device 140 and provide the warning signal to a user. For example, the display device 180 may include a buzzer, a speaker, a lamp, a display device, etc.

In example embodiments, the display device 180 may include a plurality of displays which are operable according to kinds of the warning signal received from the control device 140, as shown in Table 1. For example, when the replacement warning signal is received from the control device 140, a first display may operate to alarm a user, while when the cleaning warning signal is received from the control device 140, a second display may operate to alarm a user. Alternatively, the display device 180 may include only one display which combines different warning signs to display different first, second, third warnings. In this case, the first, second and third warnings may be formed by a plurality of different colors or sounds to be delivered as the replacement warning signal and the cleaning warning signal to a user.

TABLE 1

| | Kinds of warning | | | |
|---|---|---|---|---|
| | Normal | First warning | Second Warning | Third warning |
| First display | — | ON | ON | — |
| Second display | — | — | ON | ON |

As mentioned above, the exhaust gas cleaning system 100 may be provided in the exhaust pipe connected to the engine to purify the exhaust gas exhausted from the engine. In here, since the control device controls automatically the injection amount of the reducing agent of the reducing agent injection module 130, the system may be applied for the mechanic engine which does not an electronic control unit (ECU).

Further, the nitrogen oxide concentration sensors 150, 152 and the differential pressure sensor 160 installed in front and rear of the SCR device 120 may be used to determine abnormality of the SCR device 120. When it is determined that the SCR device 120 is in an abnormal state, an warning signal may be outputted to inform a user that maintenance is required, to thereby maintain a performance of the SCR device 120.

Figure 3:
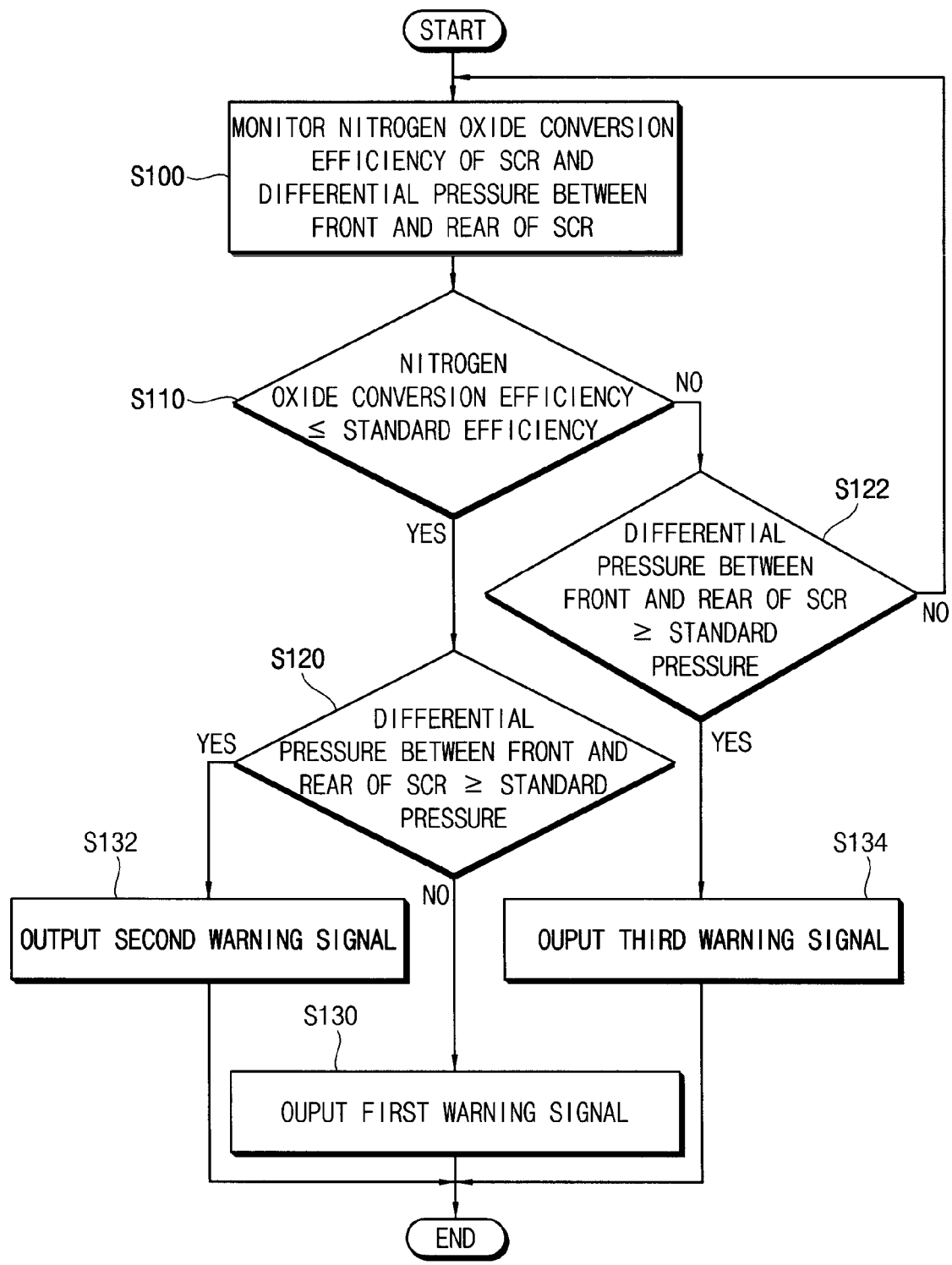
FIG. 3 is a flow chart illustrating a method of monitoring a performance of an exhaust gas cleaning system in accordance with example embodiments.

FIG. 3 is a flow chart illustrating a method of monitoring a performance of an exhaust gas cleaning system in accordance with example embodiments.

Referring to FIG. 3, first, conversion efficiency of nitrogen oxide of a selective catalyst reducing (SCR) device and a differential pressure between a front side and a rear side of the SCR device may be monitored (S100).

For example, as illustrated in FIG. 2, a concentration of nitrogen oxide of an exhaust gas may be detected using a first concentration sensor 150 and a second concentration sensor 152 respectively installed in front and rear of the SCR device 120. A control device 140 may receive the detected concentration information and calculate the conversion efficiency of nitrogen oxide of the SCR device 120.

Further, the differential pressure of the exhaust gas between front and rear of the SCR device 120 may be detected using a differential pressure sensor 160. The control device 140 may receive the detected differential pressure information.

Then, abnormality of the SCR device may be determined based on the conversion efficiency of nitrogen oxide and the differential pressure information, and when it is determined that the SCR is in an abnormal state, a warning signal may be outputted.

In particular, the calculated conversion efficiency of nitrogen oxide may be compared with a predetermined efficiency (standard efficiency) (S110), and the detected differential pressure may be compared with a predetermined pressure (standard pressure) (S120, S122).

When the calculated conversion efficiency of nitrogen oxide is lower than the standard efficiency and the deteced differential pressure is lower than the standard pressure, a first warning signal may be outputted (S130). For example, the SCR device 120 may be deteriorated so that the reduction efficiency of nitrogen oxide may be decreased. In this case, a user may replace the SCR device 120 with a new one.

When the calculated conversion efficiency of nitrogen oxide is lower than the standard efficiency and the detected differential pressure is greater than the standard pressure, a second warning signal different from the first warning signal may be outputted (S132). For example, the substance or the reducing agent included in the exhaust gas may block the front side of the SCR device 120, and the performance of the SCR device 120 may be relatively low. In this case, the SCR device 120 may be in a normal state, but the substance or the reducing agent included in the exhaust gas may block the front side of the SCR device 120. In here, the control device may alarm a user that the SCR device 120 needs to be cleaned, through a display device 180. In order to perform the cleaning, a user may increase a fuel injection amount to increase the temperature of the exhaust gas, to thereby remove the substance adsorbed on the SCR device 120, or may separate a housing 110 and then clean the blocked portion, for example, a mixing device 190 and a carrier 122, of the SCR device 120. The cleaning of the mixing device and the carrier may be performed when the abnormality is still detected even after increasing the temperature of the exhaust gas or when it is difficult to increase the temperature of the exhaust gas. Even after performing the cleaning, if the abnormality is detected, a user may replace the SCR device 120 with a new one or an overall inspection on the exhaust gas cleaning system 100 may be required.

When the calculated conversion efficiency of nitrogen oxide is greater than the standard efficiency and the detected differential pressure is greater than the standard pressure, a third warning signal different from the first and second warning signals may be outputted (S134). For example, the SCR device 120 may be in a normal state, but the substance or the reducing agent included in the exhaust gas may block the front side of the SCR device 120. A user may increase a fuel injection amount to increase the temperature of the exhaust gas, to thereby remove the substance adsorbed on the SCR device 120, or may separate the housing 110 and then clean the blocked portion, for example, the mixing device 190 and the carrier 122, of the SCR device 120. The cleaning of the mixing device and the carrier may be performed when the abnormality is still detected even after increasing the temperature of the exhaust gas or when it is difficult to increase the temperature of the exhaust gas.

Lastly, when the calculated conversion efficiency of nitrogen oxide is greater than the standard efficiency and the detected differential pressure is lower than the standard pressure, it may be determined that the SCR device 120 is in a normal state. Accordingly, any warning signal may not be outputted.

As mentioned above, in the method of monitoring an exhaust gas cleaning system in accordance with example embodiments, the concentration information of nitrogen oxide and the differential pressure information in front and rear of the selective catalyst reduction device may be used to determine abnormality of the selective catalyst reduction device. When it is determined that the selective catalyst reduction device is in an abnormal state, a warning signal may be outputted to a user, to thereby ensure performance of the exhaust gas cleaning system.

The foregoing is illustrative of example embodiments and is not to be construed as limiting thereof. Although a few example embodiments have been described, those skilled in the art will readily appreciate that many modifications are possible in example embodiments without materially departing from the novel teachings and advantages of the present invention. Accordingly, all such modifications are intended to be included within the scope of example embodiments as defined in the claims.

THE DESCRIPTION OF THE REFERENCE NUMERALS

100: exhaust gas cleaning system 110: housing
120: selective catalyst reduction device 122: carrier
124: passage 130: reducing agent injection module
132: reducing agent storage tank 134: reducing agent supply line
140: control device 150: first concentration sensor
152: second concentration sensor 160: differential pressure sensor
170: air amount sensor 180: display device
190: mixing device

What is claimed is:

1. An exhaust gas cleaning system, comprising:
    a reducing agent injection module installed in an housing which is configured to be mounted in an exhaust pipe through which an exhaust gas is discharged from an engine, the reducing agent injection module being configured to inject a reducing agent into the housing;
    a selective catalyst reduction device installed in rear of the reducing agent injection module and configured to catalytic react the reducing agent with nitrogen oxide included in the exhaust gas to reduce the nitrogen oxide;
    a differential pressure sensor configured to detect a differential pressure between a pressure in the housing in front of the selective catalyst reduction device and a pressure of the housing in rear of the selective catalyst reduction device;
    a first concentration sensor and a second concentration sensor respectively installed in front and rear of the selective catalytic reduction device, and configured to detect a concentration of nitrogen oxide within the housing; and
    a controller configured to receive the pressure information from the differential pressure sensor and concentration information of nitrogen oxide from the first and second concentration sensors and calculate conversion efficiency of nitrogen oxide of the selective catalytic reduction device from the received concentration information, and to output a first warning signal when the calculated conversion efficiency is lower than a predetermined efficiency and the detected differential pressure is lower than a predetermined pressure, a second warning signal different from the first warning signal when the calculated conversion efficiency, is lower than the predetermined efficiency and the detected differential pressure is greater than a predetermined pressure and a third warning signal different from the first and second warning signals when the conversion efficiency is greater than the predetermined efficiency and the detected differential pressure is greater than the predetermined pressure.

2. The exhaust gas cleaning system of claim 1, wherein the engine is a mechanic engine, and the controller controls the reducing agent injection module so that an injection amount of the reducing agent of the reducing agent injection module is controlled based on at least one of a change of an intake air amount and a concentration change of the nitrogen oxide in the exhaust gas.

3. The exhaust gas cleaning system of claim 1, further comprising:
    an air amount sensor to detect an amount of an air flowing into the engine,
    wherein the controller receives information of the intake air amount from the air amount sensor to control the injection amount of the reducing agent of the reducing agent injection module.

4. The exhaust gas cleaning system of claim 1, further comprising a display device to inform a user of the first to third warning signals, and wherein the display device comprises a first display to be operable when the conversion efficiency is lower than the predetermined efficiency; and a second display to be operable when the detected differential pressure is greater than the predetermined pressure.

5. The exhaust gas cleaning system of claim 1, further comprising a display device to inform a user of the first warning signal.

6. The exhaust gas cleaning system of claim 1, further comprising a mixing device installed between the reducing agent injection module and the selective catalytic reduction device in order to mix gently the reducing agent with the exhaust gas, and wherein the differential pressure sensor is connected to a first pressure line which is in communication with the housing in front of the selective catalytic reduction device and a second pressure line which is in communication with the housing in rear of the selective catalytic reduction device.

7. The exhaust gas cleaning system of claim 6, wherein the housing comprises a front side housing and a rear side housing combined separably with each other, a carrier of the selective catalytic reduction device being disposed in the rear side housing, and wherein the first pressure line is connected to the housing between the mixing device and the carrier of the selective catalytic reduction device.

8. A method of monitoring an exhaust gas cleaning system, comprising:
    detecting a differential pressure of an exhaust gas between front and rear of a selective catalytic reduction device and concentration of nitrogen oxide included in the exhaust gas;
    calculating conversion efficiency of nitrogen oxide of the selective catalytic reduction device from the detected concentration information;
    determining whether or not the selective catalytic reduction device is in an abnormal state, based on the calculated conversion efficiency and the detected differential pressure; and
    outputting a warning signal when it is determined that the selective catalytic reduction device is in an abnormal state,
    wherein outputting the warning signal comprises outputting a first warning signal when the calculated conversion efficiency is lower than a predetermined efficiency and the detected differential pressure is lower than a predetermined pressure.

9. The method of claim 8, wherein determining whether or not the selective catalytic reduction device is in an abnormal state comprises determining that the selective catalytic reduction device is in an abnormal state when the calculated conversion efficiency is lower than the predetermined efficiency or the detected differential pressure is greater than the predetermined pressure.

10. The method of claim 9, wherein determining whether or not the selective catalytic reduction device is in an abnormal state comprises determining that the selective catalytic reduction device is in an abnormal state when the calculated conversion efficiency is greater than the predetermined efficiency and the detected differential pressure is greater than the predetermined pressure.

11. The method of claim 9, wherein determining whether or not the selective catalytic reduction device is in an abnormal state comprising determining that the selective catalytic reduction device is partially blocked when the detected differential pressure is greater than the predetermined pressure to alarm that the selective catalytic reduction device needs to be cleaned.

* * * * *